June 2, 1925.
B. ALLEN
MEDICAL APPARATUS
Filed Aug. 17, 1922
1,540,589
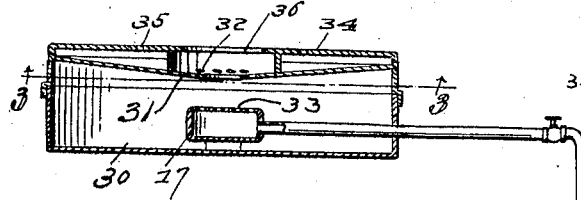
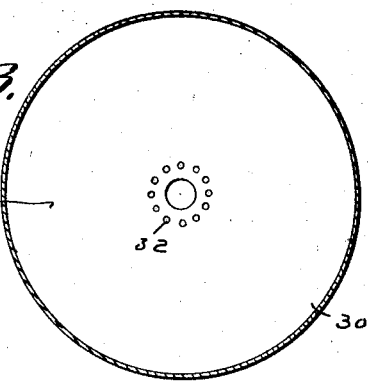
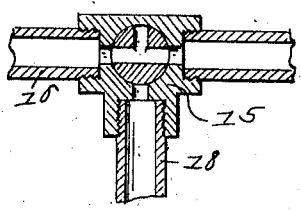
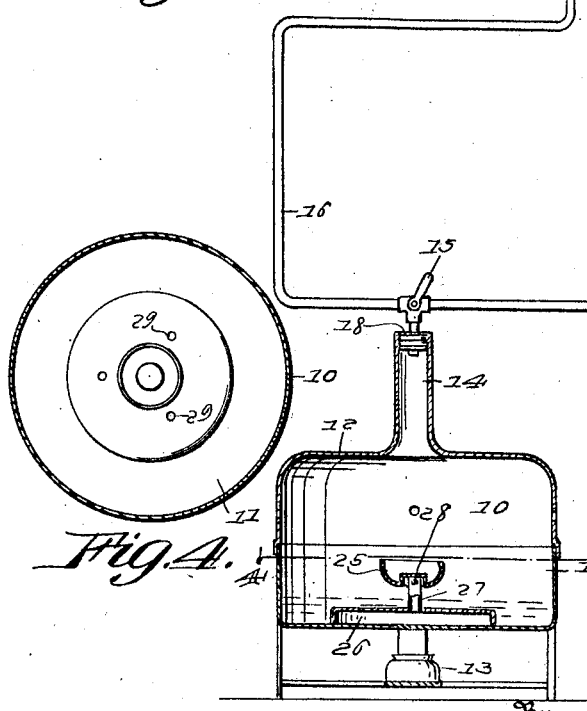
Inventor
Boston Allen, Patented June 2, 1925.

1,540,589

UNITED STATES PATENT OFFICE.

BOSTON ALLEN, OF BALTIMORE, MARYLAND.

MEDICAL APPARATUS.

Application filed August 17, 1922. Serial No. 582,420.

*To all whom it may concern:*

Be it known that BOSTON ALLEN, a citizen of the United States of America, residing in Baltimore and State of Maryland, has invented new and useful Improvements in Medical Apparatus, of which the following is a specification.

The object of the invention is to provide an apparatus for vapor treatment of certain diseases wherein heat and moisture are indicated as desirable accompanying agencies; and with this object in view the invention consists in a construction and combination of parts of which a preferred embodiment is shown in the accompanying drawings, wherein:—

Figure 1 is a side view partly in section of an apparatus embodying the invention.

Figure 2 is a detail sectional view of the controlling valve and related parts.

Figure 3 is a horizontal sectional view on the line 3—3 of Figure 1.

Figure 4 is a horizontal sectional view on the plane indicated by the line 4—4 of Figure 1.

The apparatus consists of a generator 10 preferably consisting of a vessel 11 having a removable cover 12, beneath the former of which may be arranged any suitable heating unit such as a lamp 13 while extending from the latter is an outlet dome 14 communicating under the control of a three-way valve 15 with a conveyor tube 16 having a terminal nozzle 17. The connection between the dome and the conveyor tube preferably consists of a plug 18 to permit of removal for cleansing purposes and the like and also communicating with the conveyor tube there may be arranged a fumigator or consumer 19 consisting of a casing in which is arranged an incense pan 20, and also provided with a heating unit such as the lamp 21 which in the construction illustrated is shown secured in place by means of clamping springs 22. The fumigator has a direct outlet 23 controlled by a valve 24 and when the latter is closed communication is established with the conveyor tube 16 which extends as above indicated from the bottom of the generator.

Within the generator there is arranged a medicament tray 25 adapted to be supplied with a suitable medicinal preparation of a volatile nature such as may be affected by heat or steam or both produced in the generator, and to that end the pan 11 of the generator is adapted to be supplied with water or other suitable liquid and is fitted with a steam chamber 26 exposed to the direct action of the heating unit and having an outlet tube 27 terminating in a nozzle 28 which is arranged in said medicament tray to the end that steam generated in the chamber 26 may be applied directly to and liberated beneath the surface of a medicament forming the contents of the tray. The upper wall of the steam chamber is preferably provided with a limited number of outlet perforations 29.

The nozzle 17 is arranged in a hollow stool 30 upon which the patient sits and which constitutes an applicator, serving as a means for concentrating the medicament carrying vapor from the generator to the affected parts of the patient, the upper wall 31 of the applicator preferably being of the concaved contour indicated in the drawing and being provided with the central outlet perforations 32 arranged directly above the nozzle 17 which is also provided with outlet perforations 33.

The top wall of the applicator is disposed beneath the top plate 34 in which is formed an opening 36 directly above the perforations 32, the latter being surrounded by an annular wall defining an annular water compartment which may be filled through a perforation 35.

Having described the invention, what is claimed as new and useful is:—

1. An apparatus for applying vapor treatment comprising an applicator, a generator, and a conveyor tube connecting the generator with the applicator, the applicator consisting of a hollow stool into which the conveyor tube extends, the latter having a nozzle provided with outlet perforations, the stool having an upper wall provided with perforations disposed above the perforations of the nozzle and having a top wall spaced aboved the upper wall and provided with a central opening above the perforations in the upper wall.

2. An apparatus for applying vapor treatment comprising an applicator, a generator, and a conveyor tube connecting the generator with the applicator, the applicator consisting of a hollow stool into which the conveyor tube extends, the latter being provided with a terminal nozzle having outlet perforations, said stool having an upper wall of concaved contour provided with central outlet perforations arranged above the perforations of said nozzle and having a top wall spaced from said upper wall and provided with a central opening, said central opening and perforations in said upper wall being bounded by an annular wall defining an annular water compartment which may be filled through a perforation in the top wall.

In testimony whereof he affixes his signature.

BOSTON ALLEN.